United States Patent
Nii (10) Patent No.: US 10,471,866 B2
(45) Date of Patent: Nov. 12, 2019

(54) VEHICLE SEAT

(71) Applicant: TOYOTA BOSHOKU KABUSHIKI KAISHA, Aichi-ken (JP)

(72) Inventor: Tomoki Nii, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/966,828

(22) Filed: Apr. 30, 2018

(65) Prior Publication Data
US 2018/0339616 A1    Nov. 29, 2018

(30) Foreign Application Priority Data

May 23, 2017 (JP) ................................. 2017-101764

(51) Int. Cl.
*A47C 7/20*   (2006.01)
*A47C 7/18*   (2006.01)
*B60N 2/58*   (2006.01)
*B60N 2/62*   (2006.01)

(52) U.S. Cl.
CPC .............. *B60N 2/5883* (2013.01); *A47C 7/18* (2013.01); *A47C 7/185* (2013.01); *A47C 7/20* (2013.01); *B60N 2/58* (2013.01); *B60N 2/62* (2013.01); *B60N 2205/30* (2013.01)

(58) Field of Classification Search
CPC .. B60N 2/7035; B60N 2/7047; B60N 2/7094; A47C 7/027; A47C 7/20; A47C 7/185; A47C 7/18
See application file for complete search history.

(56) References Cited

U.S. PATENT DOCUMENTS

| | | | | |
|---|---|---|---|---|
| 3,139,308 | A * | 6/1964 | Hershberger | A47C 7/20 248/163.1 |
| 4,834,458 | A * | 5/1989 | Izumida | A47C 7/18 297/452.23 |
| 6,755,475 | B1 * | 6/2004 | Tiesler | A47C 7/18 297/452.26 |
| 8,990,985 | B1 * | 3/2015 | Wilhelm | A47C 7/20 5/653 |

(Continued)

FOREIGN PATENT DOCUMENTS

| | | | | |
|---|---|---|---|---|
| DE | 2035489 A1 * | 1/1971 | | A47C 7/18 |
| DE | 3223776 C1 * | 10/1983 | | A47C 7/185 |

(Continued)

*Primary Examiner* — Timothy J Brindley
(74) *Attorney, Agent, or Firm* — Greenblum & Bernstein, P.L.C.

(57) ABSTRACT

A vehicle seat including: a seat pad made of foamed resin; and a seat cover being integral with the seat pad, wherein a seating surface of the seat pad includes a seating part and a bank part, wherein a portion of the seat cover covering a seat inner side portion of the bank part includes a seat cover main part and a planar reinforcing member arranged on a back side of the seat cover main part, wherein the reinforcing member is configured by a material bendable and deformable towards a seat pad side and includes a general section and a flexible section which can be more easily bent towards the seat pad side than the general section, and wherein a portion of the reinforcing member covering a peak side of the bank part is configured by the flexible section.

7 Claims, 6 Drawing Sheets

(56) References Cited

U.S. PATENT DOCUMENTS

| | | | | |
|---|---|---|---|---|
| 2004/0189078 A1* | 9/2004 | Andersson | ............. | B60N 2/502 297/452.49 |
| 2008/0309143 A1* | 12/2008 | Booth | ...................... | A47C 7/20 297/452.56 |
| 2010/0109390 A1* | 5/2010 | Nishimura | ............. | B60N 2/002 297/180.12 |
| 2013/0214583 A1* | 8/2013 | Uramichi | ................. | B60N 2/70 297/452.48 |
| 2014/0292043 A1 | 10/2014 | Nii et al. | | |
| 2015/0367762 A1* | 12/2015 | Yasuda | .............. | B60N 2/42745 297/216.14 |
| 2017/0079440 A1* | 3/2017 | Todd | ......................... | B62J 1/007 |
| 2018/0070731 A1* | 3/2018 | Jibiki | ...................... | A47C 7/20 |

FOREIGN PATENT DOCUMENTS

| | | | | |
|---|---|---|---|---|
| DE | 102016005387 B3 * | 2/2017 | ............. | A47C 27/20 |
| EP | 2962895 A1 * | 1/2016 | ............... | B60N 2/80 |
| EP | 3064091 A2 * | 9/2016 | ............... | A47C 7/20 |
| FR | 1518485 A * | 3/1968 | ............... | A47C 7/18 |
| FR | 2332152 A1 * | 6/1977 | ............... | A47C 7/185 |
| GB | 808602 A * | 2/1959 | .......... | B60N 2/7047 |
| JP | 59202827 A * | 11/1984 | ............. | A47C 7/185 |
| JP | 2014-193230 | 10/2014 | | |
| WO | WO-2013137065 A1 * | 9/2013 | ............... | B60N 2/66 |

* cited by examiner

VEHICLE SEAT

CROSS-REFERENCE TO RELATED APPLICATIONS

This application claims priority from Japanese Patent Application No. 2017-101764 filed on May 23, 2017, the entire contents of which are incorporated herein by reference.

TECHNICAL FIELD

The disclosure relates to a vehicle seat including a seat pad made of foamed resin and a seat cover covering the seat pad and being integral with the seat pad, in which the seat cover includes a seat cover main part and a planar reinforcing member arranged on a back side of the seat cover main part.

BACKGROUND

In such vehicle seat, there are cases where a seat cover is integrated with a seat pad made of foamed resin, and a part of the seat pad has entered a back side of the seat cover and has solidified. For example, in a vehicle seat disclosed in JP-A-2014-193230, in a seat cushion serving as a seating surface, a seat cover is integrated with a seat pad made of the foamed resin. An upper surface of the seat pad is provided with a seating part on which an occupant can sit and bank parts swelling upward in a mountain-like manner as compared with the seating part. The seating part is provided on a middle of the upper surface of the seat pad in a seat width direction. Additionally, the bank parts are respectively provided on both of left and right sides of the seating part in the seat width direction, and each of the left and right bank parts can support a side of the occupant on the seating part during cornering traveling or the like.

The seat cover includes a seat cover main part and a planar reinforcing member. The seat cover main part is configured by cloth material configuring a design surface of a seat, and includes a main surface part covering the seating part and inclined side parts covering the bank parts. Further, the inclined side part is a portion for supporting the occupant from the side, and therefore is reinforced by the planar reinforcing member. The reinforcing member is a felt surface member with a generally uniform thickness, and is arranged as a portion on a back side of each of the inclined side parts and at a seat inner side of each of the bank parts. In the known technology, by previously arranging the seat cover in a mold for the seat pad, it is possible to integrate the seat pad with the seat cover at the same time as molding the seat pad. At this time, a resin material that is the molding material of the seat pad is impregnated and solidified in an appropriate portion of the seat cover main part and the reinforcing member, so that the seat cover main part is integrated on the seat pad together with the reinforcing member.

In the known technology, when supporting an occupant at the bank parts, the seat pad receives a load of the occupant in a compression direction, so that peak sides of the bank parts are dented downward and deformed. Further, at the time of the dent deformation of the bank parts, a portion of each of the inclined side parts on the peak side is bent and deformed towards a seat pad side together with the corresponding portion of the reinforcing member. However, in the known technology, the portion of the reinforcing member on the peak side to be bent towards the seat pad side is firmly integrated with the seat pad in a state in which the reinforcing member portion is less likely to be bent due to the entry of the resin of the seat pad. Therefore, the portion of the reinforcing member on the peak side does not smoothly follow the compression of the seat pad, and a portion of the seat pad at a boundary between the reinforcing member portion and the seat pad may be torn as a load is applied in a peeling direction or a shearing direction.

SUMMARY

The disclosure has been made in view of the above-described points, and a problem to be solved by the disclosure is to arrange a reinforcing member at an appropriate position of a seat cover while allowing a load applied to a bank part to be more reliably received in a compression direction of a seat pad.

According to an aspect of the disclosure, there is provided a vehicle seat including: a seat pad made of foamed resin; and a seat cover covering the seat pad and being integral with the seat pad, wherein a seating surface of the seat pad includes a seating part forming a middle of the seating surface in a seat width direction and a bank part located at a lateral side of the seating part in the seat width direction and protruding to a seating side, wherein a portion of the seat cover covering a seat inner side portion of the bank part includes a seat cover main part configuring a design surface of the seat and a planar reinforcing member arranged on a back side of the seat cover main part which faces the seat pad, wherein the reinforcing member is configured by a material bendable and deformable towards a seat pad side and includes a general section and a flexible section which can be more easily bent towards the seat pad side than the general section, and wherein a portion of the reinforcing member covering a peak side of the bank part is configured by the flexible section.

Accordingly, on a portion of the seat cover covering the bank part, the seat cover main part is reinforced by the planar reinforcing member. The portion of the reinforcing member covering the peak side of the bank part is configured by the flexible section which is relatively easy to be bent. Therefore, when load is input into the bank part, since the flexible section smoothly follows the compression of the seat pad, it is possible to more reliably receive the load in the compression direction of the seat pad.

DETAILED DESCRIPTION

Hereinafter, embodiments for implementing the disclosure will be described with reference to FIGS. 1 to 6. In each drawing, arrows indicating a front-rear direction, an upper-lower direction, and a left-right direction of a vehicle seat are appropriately shown. In FIGS. 2 to 5, dimensions of a seat cover and a reinforcing member are exaggeratingly shown for convenience. Further, in FIG. 4, for convenience, a degree of dent deformation of a bank part is exaggeratingly shown, and an input direction of a load is illustrated by an outlined arrow.

[First Embodiment]

Figure 1:
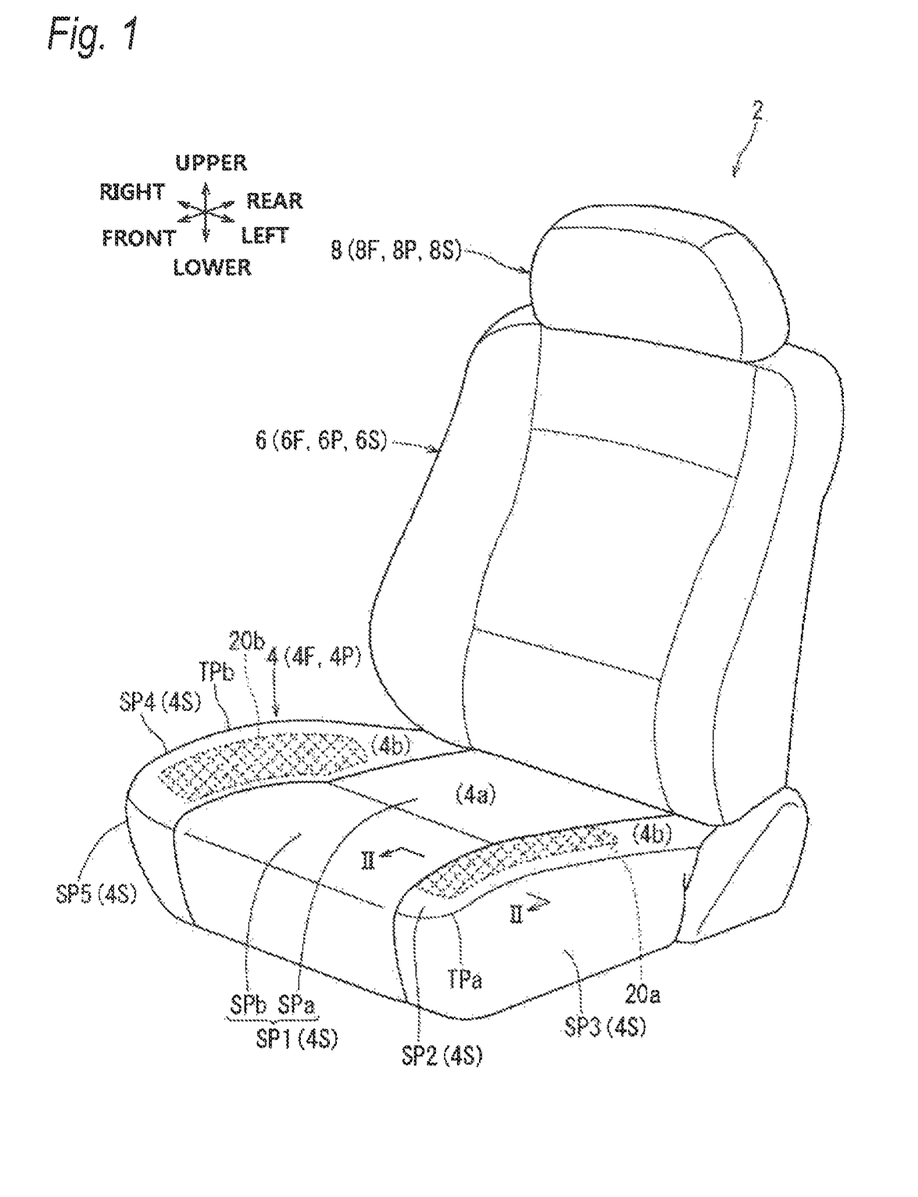
FIG. 1 is a perspective view of a vehicle seat.

A vehicle seat 2 in FIG. 1 includes a seat cushion 4, a seat back 6 and a headrest 8. Each of these members (4, 6, 8) includes a seat frame (4F, 6F, 8F) forming a seat framework, a seat pad (4P, 6P, 8P) forming an outer shape of a seat, and a seat cover (4S, 6S, 8S) covering the seat pad. Moreover, a lower portion of the seat back 6 in an upright state is coupled to a rear portion of the seat cushion 4 (described in detail later) so as to be capable of rising up and falling down. The headrest 8 is arranged at an upper portion of the seat back 6 in an upright state.

[Seat Cushion]

In the seat cushion 4, with reference to FIGS. 1 and 2, the seat pad 4P and the seat cover 4S (both described in detail later) are arranged on the seat frame 4F in a state of being integrated. The seat frame 4F is typically a substantially rectangular frame body as seen from above, and can be made of a material excellent in rigidity, such as metal or hard resin. The seat pad 4P includes a seating part 4a at a middle in a seat width direction as described later, and a pair of left and right bank parts 4b protruding upward relatively. The seat cover 4S covers the parts 4a, 4b or the like of the seat pad 4P, and reinforcing members 20a, 20b (described later) are arranged on back sides of portions of the seat cover 4S covering the left and right bank parts 4b.

Figure 4:
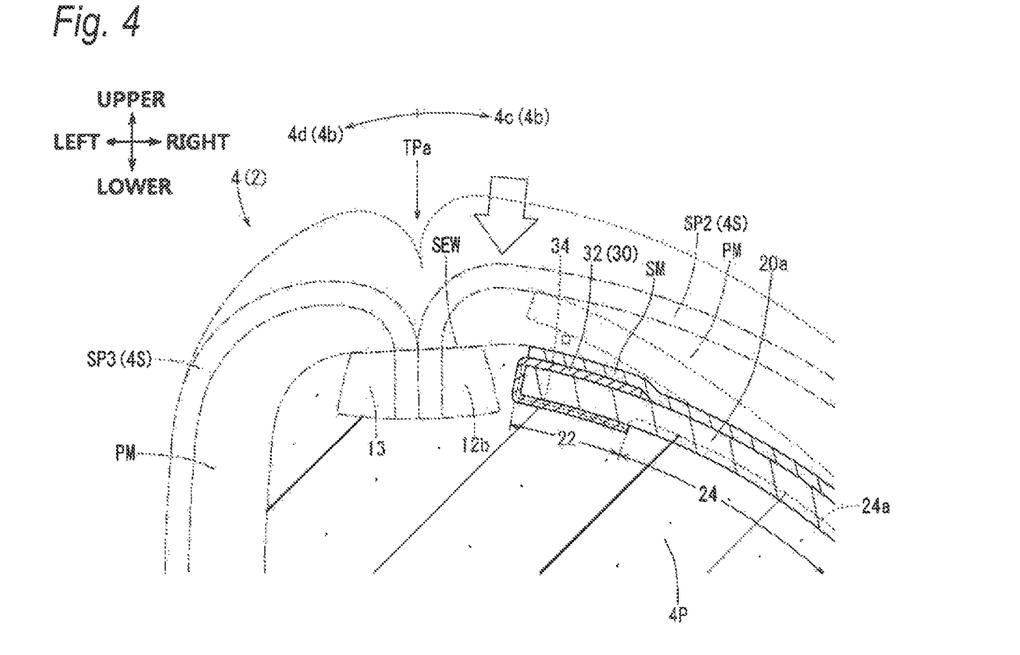
FIG. 4 is a schematic sectional view of a seat pad and a reinforcing member when a load is inputted.

During cornering traveling or the like, for example, the left bank part 4b supports a side of an occupant (not shown) on the seating part 4a. At this time, as shown in FIGS. 1 and 4, the seat pad 4P receives a load of the occupant in the compression direction, so that peak (TPa, TPb) sides of the bank parts 4b are dented downward and deformed. At the time of the dent deformation of the bank parts 4b, a portion of the seat cover 4S on the peak side is bent and deformed towards a seat pad 4P side together with the corresponding portion of the reinforcing member 20a. In this configuration, consideration should be taken such that the compression of the seat pad 4P is not inhibited by the reinforcing member 20a. In the present embodiment, the reinforcing members 20a, 20b are arranged at appropriate positions of the seat cover 4S while allowing the load applied to the bank parts 4b to be more reliably received in the compression direction of the seat pad 4P by a configuration described below. Hereinafter, the configuration will be described in detail.

[Seat Pad]

With reference to FIG. 1, the seat pad 4P is a substantially rectangular member as seen from above, and can elastically support an occupant. Various foamed resins can be used as the material of the seat pad 4P of this type, for example, polyurethane foam (density: 10 kg/m$^3$ to 60 kg/m$^3$) or similar foamed resin can be preferably used. With reference to FIGS. 1 and 2, an upper surface as a seating surface of the seat pad 4P can be divided into the seating part 4a and the pair of left and right bank parts 4b. The seating part 4a is a substantially flat portion formed on the middle in the left-right direction that is the seat width direction, and extends in the front-rear direction with a width enough for an occupant to seat. Each of the bank parts 4b is a portion swelling upward in a mountain-like manner on the left or right side of the seating part 4a, and can support a side of an occupant during cornering traveling or the like. The pair of left and right bank parts 4b is arranged symmetrically at the right and left sides. For example, the left bank part 4b, with reference to FIG. 2, is configured by a top plate side part 4c forming an inner side of the seat, and a frame part 4d forming an outer side of the seat, and the top plate side part 4c and the frame part 4d are divided at the peak TPa of the left bank part 4b. Further, the right bank part 4b shown in FIG. 1 is also configured by the top plate side part and the frame part (reference numerals thereof are omitted), and the top plate side part and the frame part are divided at the peak TPb of the right bank part 4b.

[Seat Cover]

The seat cover 4S is a surface member configuring a design surface of the seat, and with reference to FIG. 1, includes a plurality of skin pieces SP1 to SP5 forming a seat cover main part of the disclosure, and the pair of left and right reinforcing members 20a, 20b described later. As a material of the skin pieces SP1 to SP5, for example, cloth (woven fabric, knitted fabric, and nonwoven fabric) or leather (natural leather, and synthetic leather) can be used. As shown in FIG. 2, on back surfaces of the skin pieces SP1 to SP5, a pad member PM such as a urethane lamination can be attached, and a back base cloth (not shown) such as a nonwoven fabric can also be attached appropriately.

[Skin Piece (Seat Cover Main Part)]

With reference to FIG. 1, a first skin piece SP1 is a substantially rectangular skin piece covering the seating part 4a, and is formed by sewing a pair of skin pieces SPa, SPb arranged in parallel in the front-rear direction. A second skin piece SP2 is a substantially rectangular skin piece covering the top plate side part 4c of the left bank part 4b, and with reference to FIG. 2, is inclined so as to gradually face upward from a right side to a left side. A third skin piece SP3 is a substantially rectangular skin piece covering the frame part 4d of the left bank part 4b, is arranged so as to gradually face downward from the right side to the left side, and then faces backward. The adjacent skin pieces are sewn to each other in seam allowances provided at adjacent end portions, and theses seam allowances are arranged so as to protrude from the back side of the seat cover 4S. For example, with reference to FIG. 2, a seam allowance 11 at a left end portion of the first skin piece SP1 and a seam allowance 12a at a right end portion of the second skin piece SP2 are in a state of being turned back inwardly and sewn to each other, and are arranged between the seating part 4a and the left bank part 4b (in FIG. 2, a sewing wire SEW for sewing the seam allowances is indicated by a straight line for convenience). Further, a seam allowance 12b at a left end portion of the second skin piece SP2 and a seam allowance 13 at a right end portion of the third skin piece are in a state of being turned back inwardly and sewn to each other, and are arranged at a position substantially coinciding with the peak TPa of the left bank part 4b.

With reference to FIG. 1, a fourth skin piece SP4 is a substantially rectangular skin piece covering the top plate side part of the right bank part 4b, and a fifth skin piece SP5 is a substantially rectangular skin piece covering the frame part of the right bank part 4b. The fourth skin piece SP4 and the fifth skin piece SP5, and the second skin piece SP2 and the third skin piece SP3 which covers the left bank part 4b are arranged symmetrically in the right and left sides. Besides, a seam allowance (not shown) at a right end portion of the fourth skin piece SP4 and a seam allowance (not shown) at a left end portion of the fifth skin piece SP5 are in a state of being turned back inwardly and sewn to each other, and are arranged at a position substantially coinciding with the peak TPb of the right bank part 4b.

[Reinforcing Member]

With reference to FIG. 1, the pair of left and right reinforcing members 20a, 20b is a surface member which reinforces the corresponding skin pieces SP2, SP4 respectively, and is bendable and deformable towards the seat pad 4P side. Although the material of each of the reinforcing members 20a, 20b is not particularly limited as long as it has appropriate flexibility, it is preferable to use a material having better rigidity than the corresponding skin pieces SP2, SP4, and it is more preferable to use a material which is less likely to be impregnated with the resin material of the seat pad 4P than the pad member PM. As the material of this kind of reinforcing members 20a, 20b, a fiber laminate such as felt, thicker cloth or leather than the corresponding skin pieces SP2, SP4, a mat-like foamed resin body having a higher density than the pad member PM, or a sheet-like soft resin body can be exemplified. In the present embodiment, the left reinforcing member 20a is arranged on a back side of the second skin piece SP2, and the right reinforcing member 20b is arranged on a back side of the fourth skin piece SP4. Since these left and right reinforcing members 20a, 20b have substantially the same basic configuration except that they are arranged symmetrically in the left and right sides, the details of the left reinforcing member 20a will be described below as an example.

Figure 2:
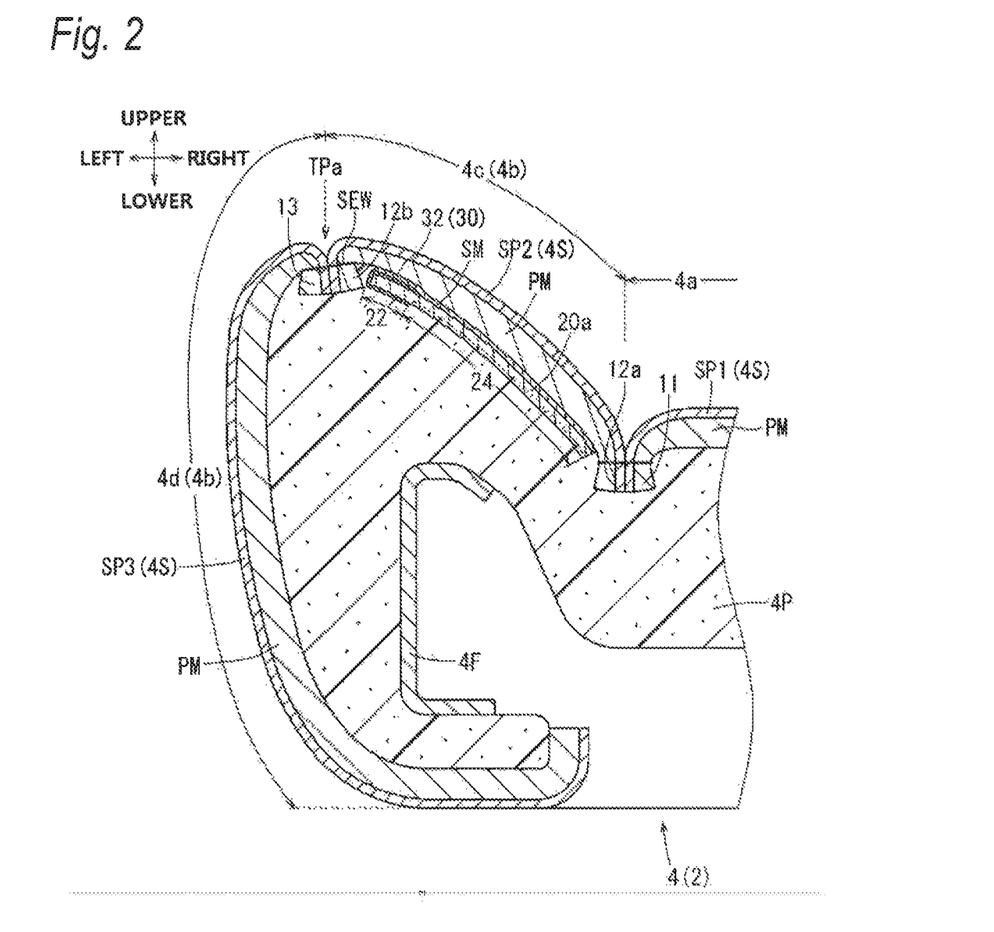
FIG. 2 is a schematic sectional view of a seat cushion corresponding to a cross section taken along a line II-II of FIG. 1.

With reference to FIG. 1, the reinforcing member 20a is a felt surface member formed into a substantially rectangular shape elongated in the front-rear direction of the seat, and is fixed to the pad member PM on the second skin piece SP2 back surface shown in FIG. 2 via an adhesive member SM. Further, the reinforcing member 20a is arranged along the second skin piece SP2, a dimension in the left-right direction which is a short side direction of the reinforcing member 20a is substantially the same as the dimension of the second skin piece SP2 portion excluding the left and right seam allowances 12a, 12b. Accordingly, a right end of the reinforcing member 20a is arranged close to the seam allowance 12a at the right end portion of the second skin piece SP2, and a left end of the reinforcing member 20a is arranged close to the seam allowance 12b at the left end portion of the second skin piece SP2 arranged on the left peak TPa.

[General Section]

Figure 3:
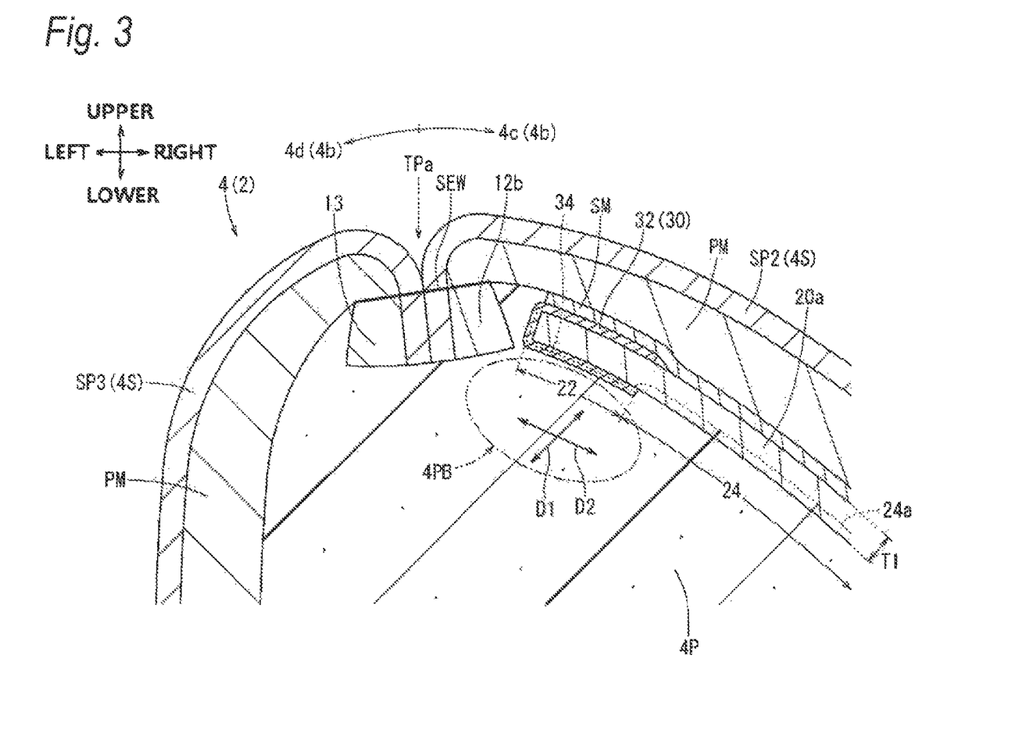
FIG. 3 is a schematic sectional view of a part of a bank part.

In the reinforcing member 20a, with reference to FIG. 2, a flexible section 22 and a general section 24 are provided at appropriate positions. The general section 24 is a portion which mainly reinforces the second skin piece SP2, and constitutes a portion of the reinforcing member portion from the right end of the reinforcing member 20a to the flexible section 22 described later. With reference to FIG. 3, the general section 24 has a moderate thickness T1 from a viewpoint of reinforcing the second skin piece SP2. Besides, an impregnated part 24a in which the resin of the seat pad 4P enters and solidifies is provided on a back side of the general section 24 facing the seat pad 4P, and the back side of the general section 24 is integrated with the seat pad 4P by the impregnated part 24a. Since the general section 24 of the present embodiment is configured by a material which is less likely to be impregnated in the seat pad 4P than the seat cover 4S, and the impregnated part 24a is only provided on the back side of the general section 24, such that the impregnated part 24a does not reach a surface of the general section 24 facing the seat cover 4S.

[Flexible Section]

With reference to FIGS. 2 and 3, the flexible section 22 is a section which is easier to be bent towards the seat pad 4P side than the general section 24, and is arranged on the peak side of the bank part 4b. That is, the flexible section 22 constitutes a left end portion that is a portion of the reinforcing member on the peak TPa side of the bank part 4b with respect to the general section 24, and is continuously formed in a long side direction (the front-rear direction in FIG. 1) of the reinforcing member 20a. In the short side direction (the left-right direction in FIG. 2) of the reinforcing member 20a, the range of the reinforcing member 20a to be provided with the flexible section 22 can be set in accordance with the degree of dent deformation of the bank part 4b. For example, in a case where the reinforcing member 20a is divided into four in the short direction so as to be divided into four regions, the flexible section 22 can be set in the leftmost region of the reinforcing member 20a, and in this case, the other region except for the flexible section 22 is the general section 24. The flexible section 22 of the present embodiment can be easily bent towards the seat pad side as compared with the general section 24 by restricting the entry of the resin of the seat pad P by a restriction part 30 described later.

[Restriction Part]

With reference to FIGS. 2 and 3, the restriction part 30 is a portion configured to restrict the entry of the resin of the seat pad 4P into the flexible section 22, and is formed by a seal member 32 that is a different member from the flexible section of the disclosure. The restriction part 30 is a surface member capable of covering the flexible section 22, and is formed by laminating and integrating a low impregnated part 34, a barrier part, and an adhesive part (in each figure, for convenience, the reference numeral 34 is given only to the low impregnated part, and the reference numerals of the barrier part and the adhesive part are omitted). The low impregnated part 34 is a portion where a small amount of resin enters and solidifies as compared with the impregnated part 24a, and is provided on the most surface layer side of the seal member 32. The low impregnated part 34 can be configured by, for example, the material (nonwoven fabric) exemplified as a material of the reinforcing member 20a, and has a smaller thickness than that of the general section 24. The barrier part is a portion configured to restrict or prevent entry of resin of the seat pad 4P exclusively, and is arranged on a back side of the low impregnated part 34. The barrier part can be configured by a surface member in which for example, a film-like resin body or a foamed resin body having a low air permeability (air permeability: 0 cc/cm²·sec to 10 cc/cm²·sec), and a fiber are tightly entangled. Further, the adhesive part is a portion which is provided on the most back layer side of the seal member 32 and is adhesively fixed to the flexible section 22, and can be configured by an inorganic adhesive component such as silicon-based inorganic adhesive component or calcium-based inorganic adhesive component, and an organic adhesive component such as thermoplastic resin or thermosetting resin. In the present embodiment, before integration of the seat pad 4P and the seat cover 4S described later, the seal member 32 as the restriction part 30 is adhered to the flexible section 22 to cover a back surface, a left end surface, a surface, or the like of the flexible section 22. Since the flexible section 22 is covered in wrapping manner with the seal member 32, impregnation of the resin material of the seat pad 4P with respect to the flexible section 22 can be restricted.

[Integration Method of Seat Pad and Seat Cover]

The seat cover 4S can be integrated with the molding of the seat pad 4P at the same time by a method such as an integral molding method. The seat pad 4P is formed by foaming the resin material of the seat pad 4P in a cavity of a molding apparatus (not shown). In the present embodiment, the seat cover 4S to which the reinforcing members 20a, 20b is fixed is arranged in advance at an appropriate position on an inner wall of the molding apparatus configuring the cavity, and the back sides of the seat cover 4S and the reinforcing members 20a, 20b are directed inward of the cavity. In this case, after injecting the resin material into the cavity, the resin material is foamed so as to form the seat pad 4P. While foaming the resin material, the resin material is impregnated into the pad member PM on the back side of the skin pieces (SP1, SP3, SP5) of the seating part 4a and the frame part 4d and solidified. Accordingly, when the resin of the seat pad 4P enters into the pad member PM and solidifies, the skin pieces (SP1, SP3, SP5) of the seating part 4a and the frame part 4d are integrated with the seat pad 4P.

In the skin pieces (SP2, SP4) of the top plate side part 4c, the reinforcing members 20a, 20b arranged on the back side thereof try to be impregnated with the resin material. At this time, on the back sides of the general sections 24 of the reinforcing members 20a, 20b, the resin material is impregnated and solidified so as to form the impregnated parts 24a. In the flexible sections 22 of the reinforcing members 20a, 20b, since the entry of resin is restricted by the barrier part of the seal member 32 as the restriction part 30, almost no resin enters. In the seal member 32 serving as the restriction part 30, a small amount of resin is impregnated into the low impregnated part 34 provided on the surface layer side thereof and solidified as compared with the impregnated part 24a. The resin of the seat pad 4P enters the general section 24 and the low impregnated part 34 and solidifies, so that the skin pieces (SP2, SP4) of the top plate side part 4c are integrated with the seat pad 4P via the reinforcing members 20a, 20b. The resin enters the low impregnated part 34 and solidifies, so that the seal member 32 as the restriction part 30 is appropriately integrated with the seat pad 4P via the low impregnated part 34.

[Usage of Seat Cushion]

With reference to FIGS. 3 and 4, for example, when an occupant is pressed against the left bank part 4b, the seat pad 4P receives a load of the occupant in the compression direction, so that the peak TP side of the bank part 4b is dented downward and deformed. At the time of the dent deformation of the bank part 4b, a portion of the seat cover 4S on the peak TPa side is bent and deformed towards the seat pad 4P side together with the reinforcing member 20a. In this configuration, it should be avoided as much as possible that the portion of the reinforcing member (flexible section 22) on the peak TPa side is less likely to be bent or the like and thus the compression of the seat pad 4P is inhibited. That is, with reference to FIG. 3, in a case where the flexible section 22 is hard and hardly bent so as not to smoothly follow the compression of the seat pad 4P, there is a possibility that a seat pad portion 4PB at a boundary between the flexible section 22 and the seat pad 4P receives a load in a peeling direction D1 or a shearing direction D2.

In the present embodiment, with reference to FIG. 3, the reinforcing member 20a includes the general section 24 and the flexible section 22 easier to be bent towards the seat pad 4P side than the general section 24. Besides, a left end portion that is the portion of the reinforcing member on the peak TPa side of the bank part 4b is configured by the flexible section 22 rather than by the general section 24. That is, the entry of the resin of the seat pad 4P is restricted by the seal member 32 serving as the restriction part 30, so that unintended hardening of the flexible section 22 is avoided. Therefore, the flexible section 22 can be more easily bent towards the seat pad side as compared with the general section 24 by maintaining the inherent flexibility of the reinforcing member. Further, since the restriction part 30 is configured by the seal member 32 that is a different member from the flexible section 22, the unintended hardening of the flexible section 22 can be prevented as much as possible without changing the configuration of the flexible section 22 itself as much as possible. Accordingly, since it is unnecessary to change of the configuration of the flexible section 22, deterioration of the flexibility of the flexible section 22 due to the configuration change can be suitably avoided. With reference to FIG. 4, at the time of the dent deformation of the bank part 4b, the flexible section 22 of the reinforcing member 20a is bent and deformed towards the seat pad 4P side and smoothly follows the compression of the seat pad 4P. As shown in FIG. 3, it is possible to suitably avoid situations where the seat pad portion 4PB receives the load in the peeling direction D1 or the shearing direction D2 when the seat pad 4P receives the load of the occupant in the compression direction. Here, also in the right bank part 4b shown in FIG. 1, the flexible section of the reinforcing member 20b is bent and deformed towards the seat pad 4P side and smoothly follows the compression of the seat pad 4P. Therefore, also in the right bank part 4b, it is possible for the seat pad 4P to receive the load of the occupant in the compression direction.

In the above-described seat configuration, for example, when the seat pad 4P receives the load, the seat pad 4P and the restriction part 30 relatively move in the shearing direction D2 shown in FIG. 3, so that the seat pad 4P and the restriction part 30 may rub against each other and be broken. Taking this into account, in the present embodiment, the restriction part 30 includes the low impregnated part 34 in which a small amount of resin is entered and solidified as compared with the impregnated part 24a, and is moderately integrated with the seat pad 4P via the low impregnated part 34. In the present embodiment, when the seat pad 4P receives the load, since the seat pad 4P and the restriction part 30 move integrally, it is possible to avoid rubbing due to the relative movement therebetween as much as possible so as to contribute to improvement of the durability of the seat.

In the present embodiment described above, on the portion of the seat cover 4S covering the bank parts 4b, the seat cover main bodies (SP2, SP4) are reinforced by the planar reinforcing members 20a, 20b. The portion of each of the reinforcing members 20a, 20b forming the peak side of the bank part 4b is configured by the flexible section 22 which is relatively easy to be bent. Therefore, when the load is input into the bank parts 4b, since the flexible section 22 smoothly follows the compression of the seat pad 4P, it is possible to more reliably receive the load in the compression direction of the seat pad 4P. In the present embodiment, the restriction part 30 appropriately restricts and limits the entry of the resin into the flexible section 22. Therefore, the inhibition of the bend deformation of the flexible section 22 towards the seat pad 4P side due to unintended hardening of the flexible section 22 caused by impregnation of the resin can be avoided as much as possible. Further, in the present embodiment, since the restriction part 30 is configured by a member different from the flexible section 22, the unintended hardening of the flexible section 22 can be prevented as much as possible without changing the configuration of the flexible section 22 itself as much as possible. In the present embodiment, the restriction part 30 is moderately integrated with the seat pad 4P by the low impregnated part 34. Therefore, when the seat pad 4P receives the load, rubbing between the seat pad 4P and the restriction part 30 due to the relative movement therebetween can be avoided as much as possible. According to the present embodiment, the reinforcing members 20a, 20b can be arranged at appropriate positions of the seat cover 4S while allowing the load applied to the bank parts 4b to be more reliably received in the compression direction of the seat pad 4P.

[Second Embodiment]

Figure 5:
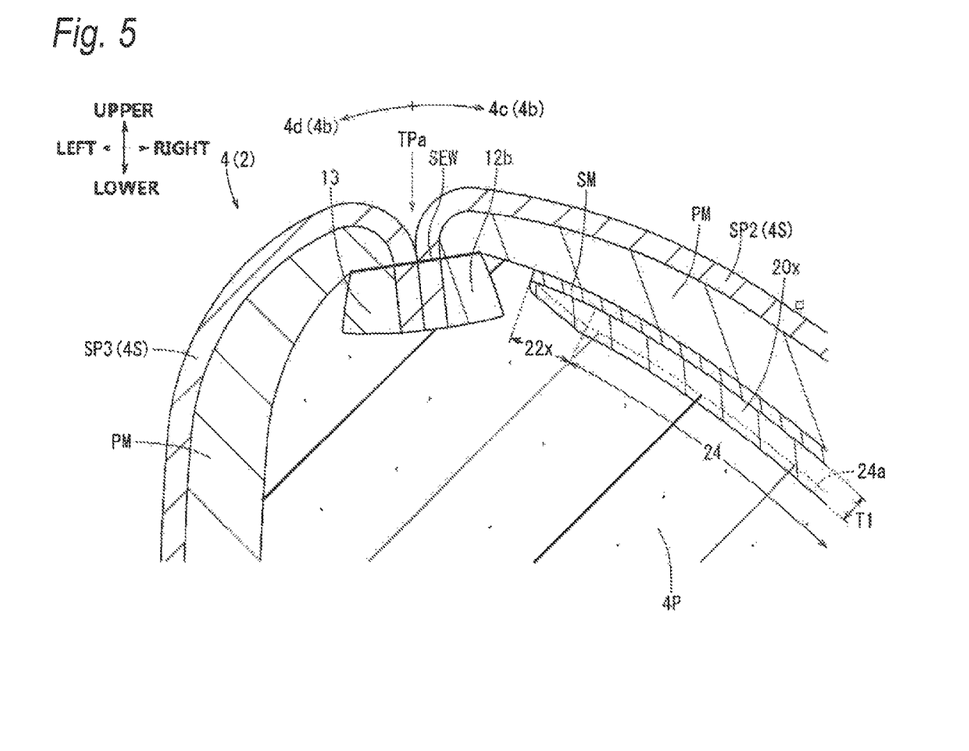
FIG. 5 is a schematic sectional view of a part of a bank part according to a second embodiment.
Figure 6:
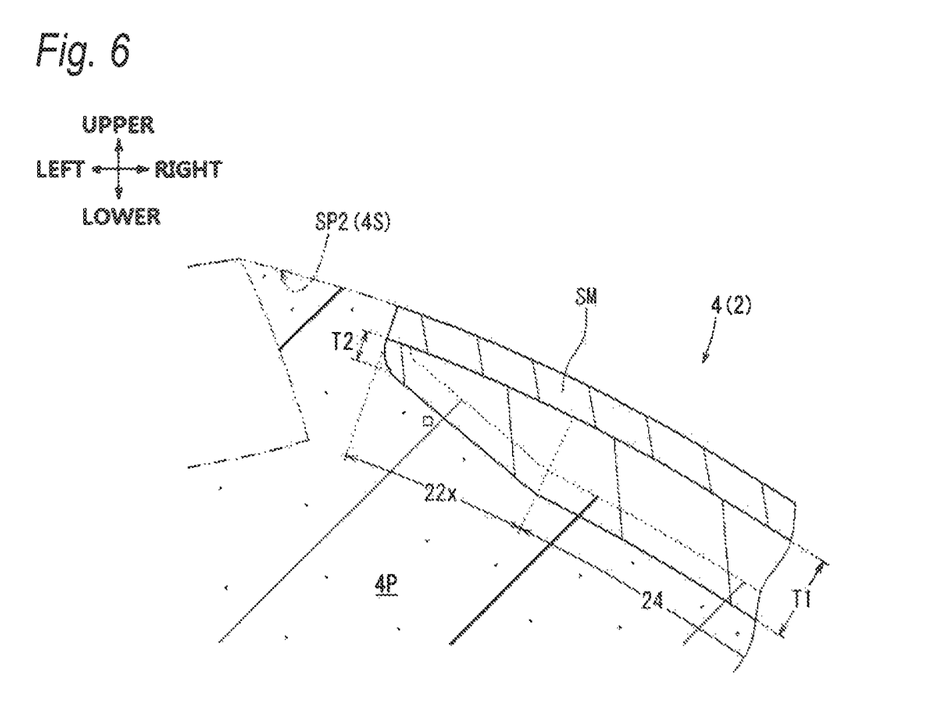
FIG. 6 is a schematic sectional view of a seat pad and a reinforcing member according to the second embodiment.

In a vehicle seat 2 in a second embodiment, the components having substantially the same basic configuration as the vehicle seat 1 of the first embodiment are given by the same reference numerals and detailed description thereof is omitted. With reference to FIGS. 5 and 6, in the seat cushion 4 of the present embodiment, a reinforcing member 20x configured to reinforce the second skin piece SP2 of the left top plate side part 4c is provided. The reinforcing member 20x is a surface member that is approximately the same as that of the reinforcing member of the first embodiment, and includes a flexible section 22x and the general section 24 having the same configuration as that of the first embodiment. With reference to FIG. 6, the flexible section 22x of the present embodiment is can more easily bend towards the seat pad 4P side than the general section 24 since an amount of material constituting the reinforcing member 20x in the flexible section 22x is smaller than that in the general section 24. That is, the amount of material constituting the reinforcing member 20x is reduced, such that a thickness in a thickness direction of the flexible section 22x is smaller than a thickness T1 in the thickness direction of the general section 24. The flexible section 22x gradually becomes thinner towards the peak TPa of the bank part 4b (becoming continuously thinner), and a thickness T2 (T2<T1) of the left end of the flexible section 22x is made smallest. By reducing the thickness of the flexible section 22x itself, the flexible section 22x itself can be more easily bent towards the seat pad 4P side than the general section 24, and in particular, can be gradually bent towards the peak TPa. Even if the resin material of the seat pad 4P is impregnated into the flexible section 22x to form another impregnated part (reference numerals thereof are omitted), the amount of resin entering in the another impregnated part becomes relatively small depending on the material amount of the flexible section 22x. Accordingly, in the present embodiment, by adjusting the amount of material constituting the reinforcing member 20x, the flexible section 22x can be more reliably bent easily. In particular, by making the thickness in the thickness direction of the flexible section 22x relatively small, the flexible section 22x can be bent more reliably easily.

The vehicle seat of the disclosure not limited to the above-described embodiments, and various other embodiments may be adopted. In the present embodiments, although the configurations (a shape, a dimension, an arrangement position, a constituent portion, or the like) of the reinforcing members 20a, 20b, 20x are exemplified, it is not intended to limit the configurations of the reinforcing members. For example, the flexible section may be continuously provided in the longitudinal direction of the reinforcing member, and may also be only provided on the portion of the reinforcing member where the input of the load is supposed. Further, in the reinforcing member, the restriction part may be configured by the flexible section itself. For example, when the flexible section is made of resin, a solidified layer solidified by melting the back side of the flexible section can be used as the restriction part. Further, when the restriction part is formed as a member different from the flexible section, various members having a barrier part can be used, and also, the low impregnated part may not be provided in the restriction part. In addition to adhesion, fusion bonding or sticking, the restriction part can be attached on the reinforcing member with a fastener such as a staple and a clip. The seal member may only cover the portion of the flexible section facing the seat pad, and it is desirable to cover at least the back surface and the left end surface of the flexible section.

In the case where the amount of material constituting the reinforcing member is adjusted so as to form the flexible section described in the second embodiment, the flexible section can also be thinner in a stepwise shape, in addition to the cases of being continuously thinned in a straight-line state or a curved state towards the peak of the bank part. If possible, it is also possible to make the flexible section easier to be bent by appropriately providing a notch or a hole part in a surface direction of the reinforcing member (decreasing the amount of constituent material). The configuration of the flexible section of the first embodiment and the configuration of the flexible section of the second embodiment can be used by combining them appropriately. The thickness of the flexible section in the thickness direction of the reinforcing member can be made smaller than the thickness of the general section in the thickness direction of the reinforcing member irrespective of the amount of material constituting the reinforcing member. In the second embodiment, although a back surface side of the flexible section facing the seat pad is in an inclined state and is gradually thinned towards the peak side of the bank part, at least one of the surface side and the back surface side of the flexible section may be in the inclined state and may be gradually thinned towards the peak side of the bank part.

In the present embodiments, although the configurations (shape, dimension, configurations of the skin pieces forming the seat cover main part, or the like) of the seat cover 4S are exemplified, it is not intended to limit the configurations of the seat cover. For example, the seat cover may be configured only by the seat cover main part. The seating part and the bank part may be covered by a piece of skin piece or a plurality of skin pieces. At a peak of the bank part, seam allowances of the skin piece may be arranged, or the seam allowances of the skin piece may not be arranged.

In the present embodiments, although the seat cushion 4 has been described as an example, the configurations of the embodiments can be applied to various seat constituent members such as the seat back 6. The bank part can be provided on at least one of the left side and the right side of the seating part. Further, the configurations of the present embodiments can be generally applied to vehicle seats, such as a car, an aircraft or a train.

The disclosure provides illustrative, non-limiting examples as follows:

According to a first aspect of the disclosure, there is provided a vehicle seat including: a seat pad made of foamed resin; and a seat cover covering the seat pad and being integral with the seat pad, wherein a seating surface of the seat pad includes a seating part forming a middle of the seating surface in a seat width direction and a bank part located at a lateral side of the seating part in the seat width direction and protruding to a seating side, wherein a portion of the seat cover covering a seat inner side portion of the bank part includes a seat cover main part configuring a design surface of the seat and a planar reinforcing member arranged on a back side of the seat cover main part which faces the seat pad, wherein the reinforcing member is configured by a material bendable and deformable towards a seat pad side and includes a general section and a flexible section which can be more easily bent towards the seat pad side than the general section, and wherein a portion of the reinforcing member covering a peak side of the bank part is configured by the flexible section.

Accordingly, on a portion of the seat cover covering the bank part, the seat cover main part is reinforced by the planar reinforcing member. The portion of the reinforcing member covering the peak side of the bank part is configured by the flexible section which is relatively easy to be bent. Therefore, when load is input into the bank part, since the flexible section smoothly follows the compression of the seat pad, it is possible to more reliably receive the load in the compression direction of the seat pad.

According to a second aspect of the disclosure, there is provided the vehicle seat according to the first aspect, wherein the flexible section includes a restriction part configured to restrict entry of resin forming the seat pad.

Accordingly, the restriction part appropriately restricts and limits the entry of the resin into the flexible section. Therefore, the inhibition of the bend deformation of the flexible section towards the seat pad side due to unintended hardening of the flexible section caused by impregnation of the resin can be avoided as much as possible.

According to a third aspect of the disclosure, there is provided the vehicle seat according to the first aspect, further including: a restriction part which is configured to restrict entry of resin forming the seat pad and is configured by a member different from the flexible section.

Accordingly, since the restriction part is configured by a member different form the flexible section, the unintended hardening of the flexible section can be prevented as much as possible without changing the configuration of the flexible section itself as much as possible.

According to a fourth aspect of the disclosure, there is provided the vehicle seat according to the second or third aspect, wherein the general section includes an impregnated part into which the resin forming the seat pad is entered and solidified, and wherein the restriction part includes a low impregnated part into which a smaller amount of the resin is entered and solidified as compared with the impregnated part.

Accordingly, the restriction part is moderately integrated with the seat pad by the low impregnated part. Therefore, when the seat pad receives the load, rubbing between the seat pad and the restriction part due to the relative movement therebetween can be avoided as much as possible.

According to a fifth aspect of the disclosure, there is provided the vehicle seat according to any one of the first to fourth aspects, wherein the flexible section is made easier to be bent towards the seat pad side than the general section by adjusting an amount of material consisting the reinforcing member to be smaller in the flexible section than that in the general section.

Accordingly, by adjusting the amount of material constituting the reinforcing member, the flexible section can be more reliably bent easily.

According to a sixth aspect of the disclosure, there is provided the vehicle seat according to any one of the first to fifth aspects, wherein a thickness of the flexible section in a thickness direction of the reinforcing member is smaller than a thickness of the general section in the thickness direction of the reinforcing member.

Accordingly, by making the thickness of the flexible section in the thickness direction of the flexible section relatively small, the flexible section can be more reliably bent easily.

According to the first aspect of the disclosure, the reinforcing member can be arranged at an appropriate position of the seat cover while allowing the load applied to the bank part to be more reliably received in the compression direction of the seat pad. According to the second aspect of the disclosure, it is possible to more reliably receive the load applied to the bank part in the compression direction of the seat pad. According to the third aspect of the disclosure, the reinforcing member having desired performance can be arranged at the appropriate position of the seat cover. According to the fourth aspect of the disclosure, the restriction part of the reinforcing member can be provided with good durability at the appropriate position of the seat cover. According to the fifth aspect of the disclosure, the reinforcing member can be more reliably bent easily towards the seat pad side. According to the sixth aspect of the disclosure, the reinforcing member can be more reliably bent easily towards the seat pad side.

What is claimed is:

1. A vehicle seat comprising:
   a seat cushion comprising:
      a seat pad made of foamed resin; and
      a seat cover covering the seat pad and being integral with the seat pad,
   wherein a seating surface of the seat pad includes a seating part forming a middle of the seating surface in a seat width direction and a bank part located at a lateral side of the seating part in the seat width direction and protruding to a seating side,
   wherein a portion of the seat cover covering a seat inner side portion of the bank part includes a seat cover main part configuring a design surface of the seat and a planar reinforcing member arranged on a back side of the seat cover main part which faces the seat pad,
   wherein the reinforcing member is configured by a material bendable and deformable towards a seat pad side and includes a general section and a flexible section which can be more easily bent towards the seat pad side than the general section,
   wherein a portion of the reinforcing member covering a peak side of the bank part is configured by the flexible section,
   wherein the reinforcing member is fixed to the seat cover main part via a fixing member, and
   wherein the reinforcing member is provided between the seat cover main part and the seat pad.

2. The vehicle seat according to claim 1,
   wherein the flexible section includes a restriction part configured to restrict entry of resin forming the seat pad into the flexible section.

3. The vehicle seat according to claim 1,
   further comprising: a restriction part which is configured to restrict entry of resin forming the seat pad into the flexible section and is configured by a member different from the flexible section.

4. The vehicle seat according to claim 3,
   wherein the general section includes an impregnated part into which the resin forming the seat pad is entered and solidified, and wherein the restriction part includes a low impregnated part into which a smaller amount of the resin is entered and solidified as compared with the impregnated part.

5. The vehicle seat according to claim 1,
   wherein the flexible section is made easier to be bent towards the seat pad side than the general section by adjusting an amount of material consisting the reinforcing member to be smaller in the flexible section than that in the general section.

6. The vehicle seat according to claim 1,
   wherein a thickness of the flexible section in a thickness direction of the reinforcing member is smaller than a thickness of the general section in the thickness direction of the reinforcing member.

7. The vehicle seat according to claim 1,
wherein the fixing member comprises an adhesive member.

* * * * *